United States Patent [19]
Kobayashi et al.

[11] Patent Number: 5,454,147
[45] Date of Patent: Oct. 3, 1995

[54] METHOD OF MANUFACTURING SOLID ELECTROLYTIC CAPACITOR

[75] Inventors: Atsushi Kobayashi; Takashi Fukaumi; Koji Sakata; Satoshi Arai; Toshihiko Nishiyama; Takashi Kono, all of Tokyo, Japan

[73] Assignee: NEC Corporation, Tokyo, Japan

[21] Appl. No.: 348,093

[22] Filed: Nov. 25, 1994

[30] Foreign Application Priority Data

Nov. 26, 1993 [JP] Japan .................................. 5-296459
Dec. 1, 1993 [JP] Japan .................................. 5-301393

[51] Int. Cl.$^6$ ...................................................... H01G 9/15
[52] U.S. Cl. ...................................................... 29/25.03
[58] Field of Search ................................. 361/523, 528, 361/529, 535, 537, 538; 29/25.03

[56] References Cited

U.S. PATENT DOCUMENTS 5,099,398  3/1992  Kurahayashi et al. .................. 25/25.03

FOREIGN PATENT DOCUMENTS 60-000948  1/1985  Japan .
63-158829  7/1988  Japan .
4-357811  10/1992  Japan .

Primary Examiner—George Fourson
Assistant Examiner—Thomas G. Bilodeau
Attorney, Agent, or Firm—Sughrue, Mion, Zinn, Macpeak & Seas

[57] ABSTRACT

The invention provides a method of manufacturing a solid electrolytic capacitor, including the steps of forming an oxide film serving as dielectric substance around a porous compact composed of valve action metal having an anode lead projecting therefrom, forming a resist layer around the anode lead and on a portion of the porous compact disposed in the vicinity of the anode lead, forming a conducting polymer compound layer on both the resist layer and the oxide film, and removing concurrently the resist layer and a part of the conducting polymer compound layer disposed on the resist layer. For instance, when the resist layer is composed of glass, the resist layer is removed by applying mechanical impact thereto.

17 Claims, 3 Drawing Sheets

METHOD OF MANUFACTURING SOLID ELECTROLYTIC CAPACITOR

BACKGROUND OF THE INVENTION

1. Field of the Invention

The invention relates to a method of manufacturing a solid electrolytic capacitor, and more particularly to a method of manufacturing a solid electrolytic capacitor including the conducting polymer compound as solid electrolyte.

2. Description of the Related Art

With development of science technology, electrical devices are required to be down-sized much more and have greater reliability. With respect to a capacitor, it is also desired to develop a solid electrolytic capacitor having a performance sufficiently covering a high frequency band, and also having a reliability and a large capacity. In order to manufacture such a capacitor, much of research and development has been conducted.

In general, a solid electrolytic capacitor includes a first electrode or an anode composed of porous compact of valve action metal such as tantalum (Ta) and aluminum (Al), an oxide film derived from the valve action metal and serving as a dielectric substance, and a second electrode or a cathode partially composed of solid electrolyte such as manganese dioxide ($MnO_2$) and 7,7,8,8-tetracyanoquinodimethane (TCNQ) complex salt. The solid electrolyte is required to have functions for electrically connecting an entire dielectric substance disposed in the porous compact to leads of the electrodes, and also for repairing electrical short-circuit derived from defects of the oxide film. Accordingly, it is not allowed to use metal having high electrical conductivity, but having no function for repairing electrical short-circuit, as a solid electrolyte. For instance, manganese dioxide ($MnO_2$), which can be converted to insulative material due to heat generated by short-circuit current, has been often used as a solid electrolyte.

However, a solid electrolytic capacitor having manganese dioxide ($MnO_2$) as a part of an electrode cannot have a sufficiently high electrical conductivity, and hence the impedance in high frequency band cannot be reduced. In addition, a solid electrolytic capacitor having TCNQ complex salt as a part of an electrode can have only a poor thermal resistance, because TCNQ complex salt is easy to be thermally decomposed.

Recently, new materials have been developed in the field of high polymer. For instance, there has been developed a conducting polymer including conjugate high polymer such as polyacetylene, poly-p-phenylene, polypyrrole and polyaniline to which is added a dopant or an electron donative and/or electron attractive compound. Among these conducting polymers, polypyrrole is widely used as a solid electrolyte of a solid electrolytic capacitor, because polypyrrole is superior to other conducting polymers in terms of electrical conductivity and stability. For instance, Japanese Unexamined Patent Public Disclosure No. 63-158829 has suggested the use of polypyrrole for a solid electrolyte of a solid electrolytic capacitor.

However, while a conducting polymer compound layer is being formed, a conducting polymer compound layer often adheres to an anode lead, because monomer solution used for forming the conducting polymer compound layer has the low viscosity. As a result, when an external anode lead terminal is welded to an anode lead, a conducting polymer compound layer serving as a cathode is in contact with the external anode lead terminal. This poses a problem that it is impossible to ensure electrical insulation between the conducting polymer compound layer and the external anode lead terminal.

On the other hand, there has been known in the art the method in which an insulative layer is formed on an anode lead to thereby prevent that an anode lead is covered with a solid electrolytic layer. For instance, Japanese Unexamined Patent Public Disclosure No. 60-948 has suggested such a method. Although the method suggested in the Disclosure is directed to solving a short-circuit problem in a capacitor having manganese dioxide ($MnO_2$) as solid electrolyte, it is possible to apply the method to a capacitor using conducting polymer compound therein. In accordance with the method, it is possible to prevent conducting polymer compound from being formed on an anode lead. However, though the conducting polymer compound is not formed on an anode lead, the conducting polymer compound is formed on an insulative layer. As a result, there still remains a possibility that a conducting polymer compound layer is in contact with an external anode lead terminal when a capacitor is under thermal expansion or shrinkage.

SUMMARY OF THE INVENTION

It is an object of the present invention to provide a method by which it is possible to remove a conducting polymer compound layer formed on an anode lead of a capacitor, to thereby ensure an electrical insulation, at a welding point of an anode lead with an external anode lead terminal, between the conducting polymer compound layer serving as a cathode and the external anode lead terminal.

The invention provides a method of manufacturing a solid electrolytic capacitor, including the steps of forming an oxide film serving as dielectric substance around a porous compact composed of valve action metal having an anode lead projecting therefrom, forming a resist layer around the anode lead and on a portion of the porous compact disposed in the vicinity of the anode lead, forming a conducting polymer compound layer on both the resist layer and the oxide film, and removing concurrently the resist layer and a part of the conducting polymer compound layer disposed on the resist layer.

In a preferred embodiment, the resist layer is composed of any one of materials selected from a group consisting of thermally fusible organic compound, organic compound having a photodissociation property, organic compound having a thermal decomposition property, acid-soluble organic compound, alkali-soluble organic compound, solvent-soluble organic compound and solvent-swollen organic compound.

In another preferred embodiment, the resist layer is composed of glass.

In still another preferred embodiment, the resist layer is removed by applying mechanical impact thereto.

In yet another preferred embodiment, the method further includes the steps of forming a carbon layer on the conducting polymer compound layer, and attaching an electrode to the carbon layer.

In still yet another preferred embodiment, the resist layer is composed of paraffin.

In further preferred embodiment, the resist layer is removed by blowing a high temperature air thereto.

In further preferred embodiment, the air has 120 degrees centigrade or more of temperature.

In further preferred embodiment, the air is accelerated by passing through a nozzle.

In further preferred embodiment, the resist layer is composed of butadiene resin.

In further preferred embodiment, the resist layer is removed by heating.

In further preferred embodiment, the resist layer and the conducting polymer compound layer is heated at 300 degrees centigrade or more.

In further preferred embodiment, the resist layer is removed by heating and further blowing a pressurized air thereto.

In further preferred embodiment, the resist layer is composed of cresol novolak resin.

In further preferred embodiment, the resist layer is removed by soaking the two layers in sodium hydroxide solution.

In further preferred embodiment, the resist layer is composed of epoxy resin.

In further preferred embodiment, the resist layer is removed by ultrasonically cleaning the two layers in pure water.

The advantages obtained by the aforementioned present invention will be described hereinbelow.

In accordance with the invention, it is possible to easily and perfectly remove a conducting polymer compound layer formed on an anode lead of a capacitor, to thereby ensure perfect electrical insulation between a conducting polymer compound layer serving as a cathode layer of a capacitor and an external anode lead terminal having been welded to a capacitor.

Furthermore, in accordance with the invention, it is possible to weld an external anode lead terminal to a capacitor in proximity to an anode lead. This advantage ensures a solid electrolytic capacitor having a superior volumetric efficiency and producing only a little amount of leak current.

Thus, the invention is useful for down-sizing and higher integration of electronic devices.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIGS. 1A, 1B and 1C are arranged in an order of the steps for manufacturing the solid electrolytic capacitor.

DESCRIPTION OF THE PREFERRED EMBODIMENTS

Preferred embodiments in accordance with the present invention will be explained hereinbelow with reference to drawings.

Figure 1A:
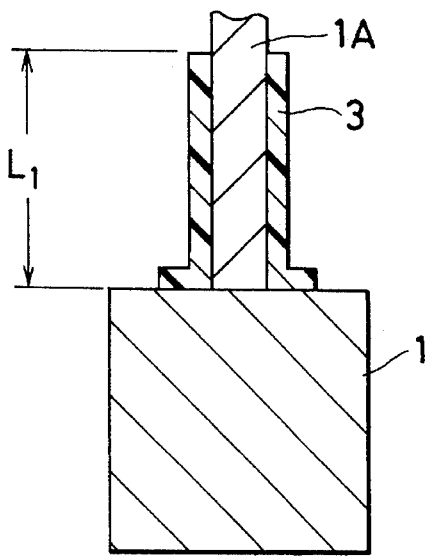
FIGS. 1A, 1B and 1C are cross-sectional views of a capacitor element of a solid electrolytic capacitor manufactured in accordance with the invention.

With reference to FIGS. 1A, 1B, 1C and 2, the method in accordance with the invention will be explained hereinbelow in an order of manufacturing steps. First, an oxide film (not illustrated) serving as an dielectric substance is formed on a surface of a sintered valve action metal 1 which will serve as an anode and around an anode lead 1A. Though not illustrated, the surface of the sintered valve action metal 1 has a mass of irregularities. Then, as illustrated in FIG. 1A, a resist is applied around the anode lead 1A, and subsequently the resist is added to thereby form a resist layer 3.

Figure 1B:
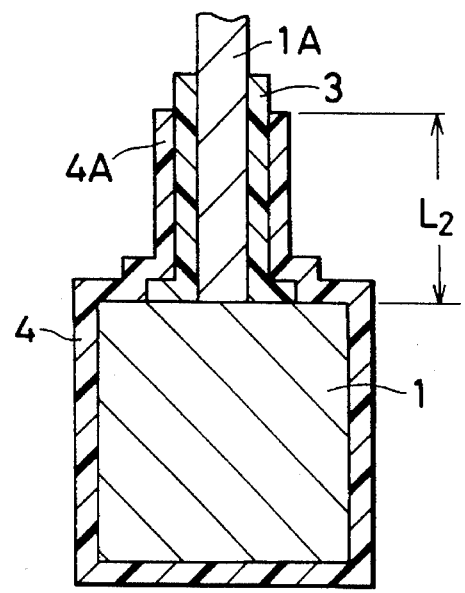
Figure 1C:
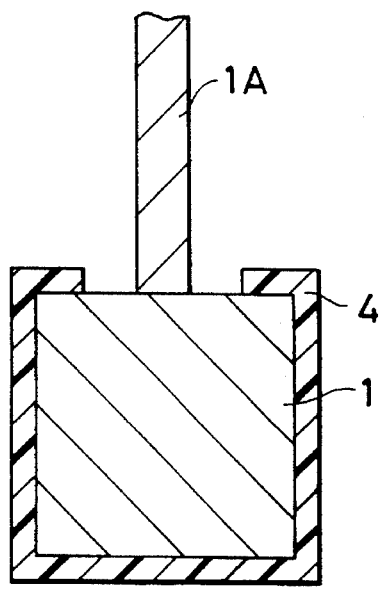
Figure 2:
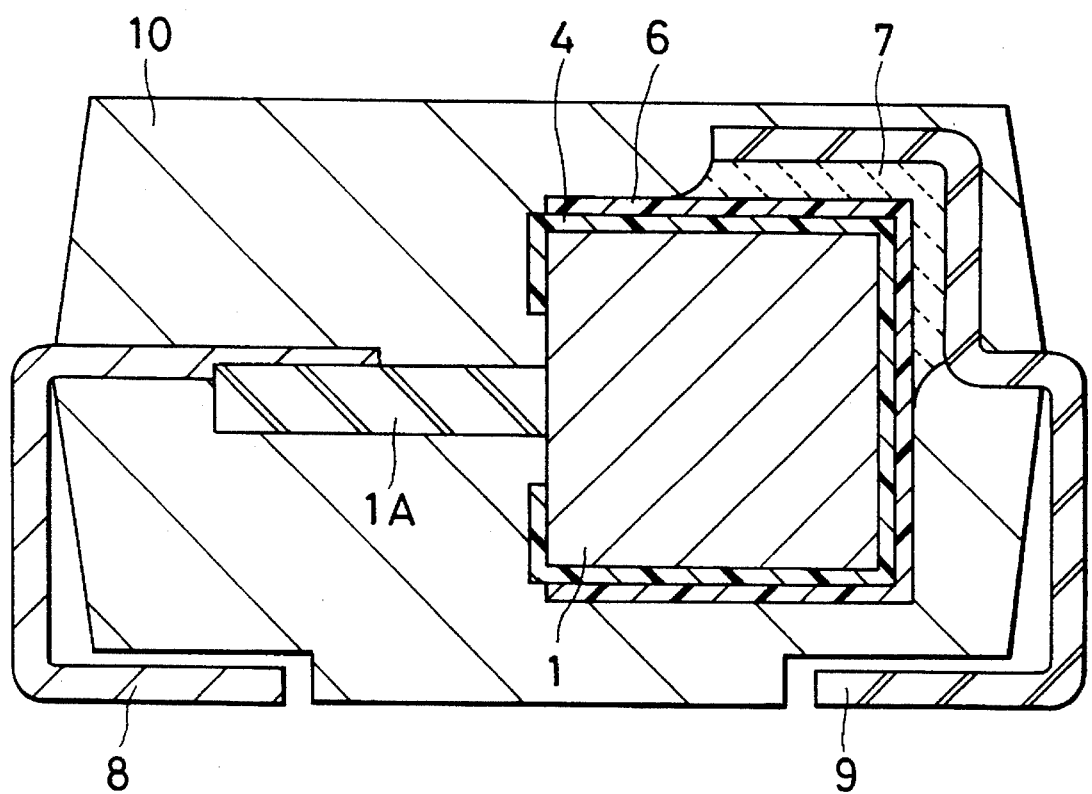
FIG. 2 is a cross-sectional view of a chip-type tantalum solid electrolytic capacitor manufactured in accordance with the embodiments 1 to 5.

Then, as illustrated in FIG. 1B, conducting polymer compound layers 4 and 4A are formed on the oxide film so that the conducting polymer compound sufficiently penetrate the irregularities. Then, as illustrated in FIG. 1C, the resist layer 3 and the conducting polymer compound layer 4A are concurrently removed to thereby ensure electrical insulation between the anode lead 1A and the conducting polymer compound layer 4. Then, as illustrated in FIG. 2, an electrode 6 composed of metal is attached to the conducting polymer compound layer 4. It is preferable to dispose a carbon layer between the electrode 6 and the conducting polymer compound layer 4 for ensuring better contact of the electrode 6 with the layer 4. Then, an external anode lead terminal 8 is welded to the anode lead 1A, and further an external cathode lead terminal 9 is attached to the electrode 6 through an electrically conductive adhesive 7. Finally, a resultant is covered with epoxy resin 10 so that free ends of the lead terminals 8 and 9 are located outside of the epoxy resin 10. Thus, a chip-type solid electrolytic capacitor is completed.

Hereinbelow will be explained embodiments in accordance with the invention. However, it should be noted that the present invention is not limited only to these embodiments.

SAMPLE 1

A pellet composed of sintered tantalum (Ta)fine powder and shaped in rectangular parallelopiped having 1 mm of length, 1 mm of width and 1 mm of thickness, and having 30,000/g of CV product value which is defined as a product of capacitance C [µF] per 1 gram and an anodic oxidation voltage V, was anodically oxidized with a voltage of 48 V in a solution containing 0.1% by weight of phosphoric acid.

Then, paraffin is applied around the anode lead 1A of the sintered pellet to thereby form the resist layer 3 composed of paraffin. The resist layer 3 has about 6 mm on an average of length $L_1$ (see FIG. 1A) along the anode lead 1A.

Then, there was prepared aniline acid solution by mixing a solvent containing 70% by weight of ethanol and 30% by weight of water with aniline and p-toluenesulfonic acid equal in tool to aniline in an amount so that the aniline and p-toluenesulfonic acid occupy 15% by weight on the basis of a weight of the solvent. Then, the sintered pellet was soaked in the aniline solution of 0 degree centigrade for 30 seconds, and subsequently the pellet was stood for 15 minutes at a room temperature. Then, the sintered pellet was soaked for 30 seconds at 0 degree of temperature in a solution containing 5% by weight of ammonium dichromate and 48% by weight of p-toluenesulfonic acid, and subsequently was stood for 30 minutes at a room temperature. Thus, the polymerization was achieved and hence black-colored polyaniline was formed on a surface of the oxide film.

The steps of soaking the pellet in the aniline solution, soaking the pellet in the oxidizer solution, achieving the polymerization, and soaking the pellet in the acidic solution were repeated ten times. Thus, there were formed the conducting polymer compound layers 4 and 4A composed of polyaniline. The conducting polymer compound layer 4A has about 2 mm on an average of a length $L_2$ (see FIG. 1B) along the anode lead 1A.

Air under pressure at the temperature of 120 degrees centigrade was blown out through a nozzle to the anode lead 1A on which the conducting polymer compound layer 4A composed of polyaniline was formed, to thereby thermally melt the resist layer 3 composed of paraffin and at the same time remove the conducting polymer compound layer 4A composed of polyaniline.

Then, a carbon paste was applied on the conducting polymer compound layer 4A commercially available from Acheson Industries, Inc. under the trade name of "Electrodug 112". The carbon layer was made dried to thereby form a carbon layer (not illustrated) over the conducting polymer compound 4A. Then, silver paste commercially available from Fujikura Kasei Corporation under the trade name of "Dotite D-550" was applied on the carbon layer, and subsequently the silver layer was dried to thereby form the electrode layer 6.

Then, the external anode lead terminal 8 was welded to the anode lead 1A at a location spacing from a base of the anode lead 1A in the range of 0.5 to 1 mm. The external cathode lead terminal 9 was secured to the electrode layer 6 through the electrically conductive adhesive 7, and then a resultant was covered with epoxy resin 10 so that ends of the terminals 8 and 9 are located outside of the epoxy resin 10. Thus, a capacitor having 3.3 µF of a capacitance was completed. As illustrated in FIG. 2, the external anode lead terminal 8 is not in contact with the conducting polymer compound layer 4, resulting in ensuring the electrical insulation between them. The thus manufactured chip-type solid electrolytic capacitor has a size of 3.2 mm×1.6 mm×1.6 mm.

SAMPLE 2

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet.

Polybutadiene resin was applied around the anode lead 1A, and then the polybutadiene resin was dried to thereby form the resist layer 3 composed of butadiene resin. The resist layer 3 has 5 mm on an average of a length $L_1$ along the anode lead 1A.

The conducting polymer compound layers 4 and 4A were formed in a similar way as the sample 1. The conducting polymer compound layer 4A has 3 mm on an average of a length $L_2$ along the anode lead 1A.

The anode lead 1A, on which the conducting polymer compound layer 4A composed of polyaniline was formed, was interposed with a pair of heater chips for 90 seconds. The heater chips heated the anode lead 1A up to 300 degrees centigrade to thereby thermally decompose the resist layer 3 composed of butadiene. Concurrently, the conducting polymer compound layer 4A composed of polyaniline was removed. In addition, pressurized air was applied to the conducting polymer compound layer 4A. Thus, the conducting polymer compound layer 4A was almost completely removed from the anode lead 1A.

In a similar way as the sample 1 except the above mentioned steps, a solid electrolytic capacitor was completed. Similarly to the sample 1, the external anode lead terminal 8 is not in contact with the conducting polymer compound layer 4 composed of polyaniline. Thus, electrical insulation is ensured between the external anode lead terminal 8 and the conducting polymer compound layer 4.

SAMPLE 3

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet.

Cresol novolak resin was applied around the anode lead 1A, and then the cresol novolak resin was dried to thereby form the resist layer 3 composed of cresol novolak resin. The resist layer 3 has 6 mm on an average of a length $L_1$ along the anode lead 1A.

Then, the sintered pellet was soaked in a pyrrole solution and then in a solution containing ferric oxide at 5% by weight. The soaking in these solutions was repeated fifteen times to thereby form conducting polymer compound layers 4 and 4A composed of polypyrrole. The conducting polymer compound layer 4A composed of polypyrrole has 3 mm on an average of a length $L_2$ along the anode lead 1A.

Then, the sintered pellet was soaked for 5 minutes in a solution containing sodium hydroxide (NaOH) at 15%, to thereby melt the resist layer 3 composed of cresol novolak resin, and concurrently remove the conducting polymer compound 4A. Thus, the conducting polymer compound layer 4A composed of polypyrrole was almost completely removed from the anode lead 1A.

In a similar way as the sample 1 except the above mentioned steps, a solid electrolytic capacitor was completed. Similarly to the sample 1, the external anode lead terminal 8 is not in contact with the conducting polymer compound layer 4 composed of polypyrrole. Thus, electrical insulation is ensured between the external anode lead terminal 8 and the conducting polymer compound layer 4.

SAMPLE 4

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet.

Epoxy resin was applied around the anode lead 1A to thereby form the resist layer 3 composed of epoxy resin. The resist layer 3 has 5 mm on an average of a length $L_1$ along the anode lead 1A.

The conducting polymer compound layers 4 and 4A were formed in a similar way as the sample 3. The conducting polymer compound layer 4A composed of polypyrrole has 2 mm on an average of a length $L_2$ along the anode lead 1A.

Then, the sintered pellet was washed for 15 minutes in a solution containing N-methyl-2-pyrolidone of 120 degrees centigrade, to thereby swell the resist layer 3 composed of epoxy resin, and then ultrasonically cleaned for 5 minutes in hot pure water. Thus, the resist layer 3 and the conducting polymer compound layer 4A composed of polypyrrole were concurrently removed. Thus, the conducting polymer compound layer 4A was almost completely removed from the anode lead 1A.

In a similar way as the sample 1 except the above mentioned steps, a solid electrolytic capacitor was completed. Similarly to the sample 1, the external anode lead terminal 8 is not in contact with the conducting polymer compound layer 4 composed of polypyrrole. Thus, electrical insulation is ensured between the external anode lead terminal 8 and the conducting polymer compound layer 4.

SAMPLE 5

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet.

To the anode lead 1A of the sintered pellet was applied a methanol suspension containing fine particles of glass having 380 degrees centigrade of a melting point. The methanol suspension was melted at 420 degrees centigrade in nitrogen atmosphere to thereby form the resist layer 3 composed of glass having a low melting point. The resist layer 3 has 5 mm on an average of a length $L_1$ along the anode lead 1A.

The sintered pellet was anodically oxidized again with a voltage of 48 volts for repairing the oxide film.

The conducting polymer compound layers 4 and 4A were formed in a similar way as the sample 3. The conducting polymer compound layer 4A composed of polypyrrole has 2 mm on an average of a length $L_2$ along the anode lead 1A.

Then, the anode lead 1A on which the conducting polymer compound layer 4A composed of polypyrrole was formed was pressed with a pair of power block to thereby crush the resist layer 3 composed of glass having a low melting point, and at the same time remove the conducting polymer compound layer 4A. In addition, air under pressure was blown to the conducting polymer compound layer 4A. Thus, the conducting polymer compound layer 4A was almost completely removed from the anode lead 1A.

In a similar way as the sample 1 except the above mentioned steps, a solid electrolytic capacitor was completed. Similarly to the sample 1, the external anode lead terminal 8 is not in contact with the conducting polymer compound layer 4 composed of polypyrrole. Thus, electrical insulation is ensured between the external anode lead terminal 8 and the conducting polymer compound layer 4.

COMPARATIVE SAMPLE 1

Figure 3:
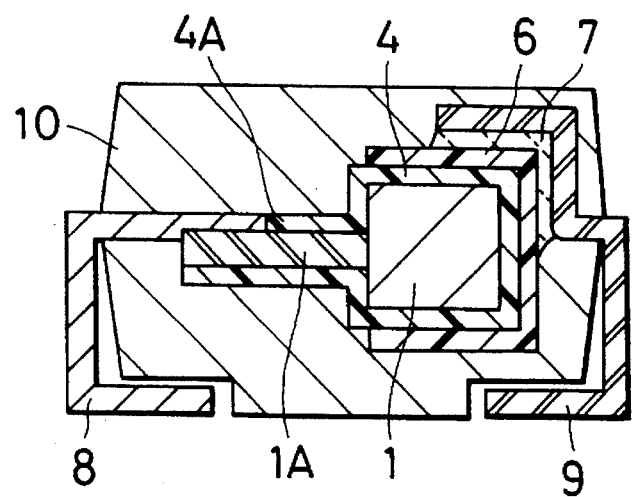
FIG. 3 is a cross-sectional view of a chip-type tantalum solid electrolytic capacitor of comparative sample 1 manufactured in accordance with the prior art.
Figure 4:
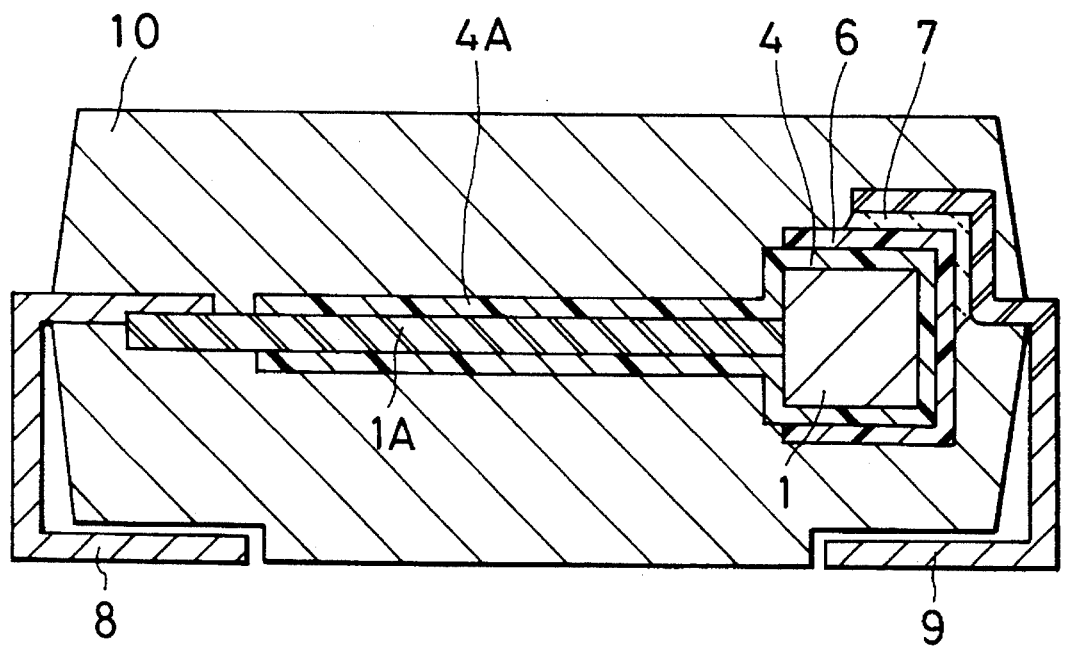
FIG. 4 is a cross-sectional view of a chip-type tantalum solid electrolytic capacitor of comparative sample 2 manufactured in accordance with the prior art.

Hereinbelow will be explained a chip-type tantalum solid electrolytic capacitor manufactured in accordance with the prior art. Namely, the solid electrolytic capacitor in the comparative sample 1 is manufactured without a step for forming the resist layer 3, unlike the invention. FIG. 3A illustrates a cross-section of the capacitor of the comparative sample 1.

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet. A capacitor was completed in a similar way as the sample 1, but without forming the resist layer 3.

Accordingly, around the anode lead 1A of the sintered pellet remains as it is the conducting polymer compound layer 4A having 3 mm of a length $L_2$. Thus, the external anode lead terminal 8 is in contact with the conducting polymer compound layer 4 at a welding point located at 1 mm from the base of the anode lead 1A. Hence, the anode lead terminal 8 is not electrically insulated from the conducting polymer compound layer 4 composed of polyaniline.

The completed chip-type solid electrolytic capacitor has an overall size of 3.2 mm×1.6 mm×1.6 mm similarly to the sample 1.

COMPARATIVE SAMPLE 2

A chip-type solid electrolytic capacitor in the comparative sample 2 is manufactured in a similar way as the comparative sample 1. Namely, the chip-type solid electrolytic capacitor in the comparative sample 2 is manufactured without forming a resist layer unlike the invention. The capacitor in the comparative sample 2 has a cross-section as illustrated in FIG. 3B.

A pellet composed of sintered tantalum (Ta) fine powder and shaped in rectangular parallelopiped having 1 mm of length, 1 mm of width and 1 mm of thickness, and having 30,000/g of CV product value is used. Similarly to the sample 1, an oxide film was formed around the sintered pellet. A capacitor was completed in a similar way as the sample 1, but without forming the resist layer 3.

Accordingly, around the anode lead 1A of the sintered pellet remains as it is the conducting polymer compound layer 4A having 3 mm of a length $L_2$. In the comparative sample 2, the external anode lead terminal 8 was welded to the anode lead 1A at a location spacing from the base of the anode lead 1A in the range of 3.3 to 3.8 mm. Thus, the external anode lead terminal 8 is electrically insulated from the conducting polymer compound layer 4 composed of polyaniline. However, since the welding point of the terminal 8 to the anode lead 1A is remote from the base of the anode lead 1A, the completed capacitor had to have a larger overall size, 6.0 mm×3.2 mm×2.5 mm, than the samples 1 to 3 and the comparative sample 1.

Table 1 shows an overall size, a volumetric efficiency, and an amount of leak current during a rated voltage is applied to a capacitor in each of the samples 1 to 5 and the comparative samples 1 and 2. With reference to Table 1, it can be understood that the solid electrolytic capacitors in accordance with the samples 1 to 5 are superior to the comparative sample 2 with respect to a volumetric efficiency by about six times. In addition, the samples 1 to 5 have quite a smaller leak current than the comparative sample 1, because it is ensured that the conducting polymer compound layer is electrically insulated from the external anode lead terminal.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

TABLE 1

| | Overall Size (mm) | Volumetric Efficiency ($\mu F/mm^3$) | Average Leak Current (nA) |
|---|---|---|---|
| SAMPLE 1 | 3.2 × 1.6 × 1.6 | 0.40 | 6.4 |
| SAMPLE 2 | 3.2 × 1.6 × 1.6 | 0.40 | 5.7 |
| SAMPLE 3 | 3.2 × 1.6 × 1.6 | 0.40 | 5.3 |
| SAMPLE 4 | 3.2 × 1.6 × 1.6 | 0.40 | 5.8 |
| SAMPLE 5 | 3.2 × 1.6 × 1.6 | 0.40 | 7.3 |
| COMPARATIVE SAMPLE 1 | 3.2 × 1.6 × 1.6 | 0.40 | >100 μA |
| COMPARATIVE SAMPLE 2 | 6.0 × 3.2 × 2.5 | 0.069 | 5.9 |

What is claimed is:

1. A method of manufacturing a solid electrolytic capacitor, comprising the steps of:

forming an oxide film serving as dielectric substance around a porous compact composed of valve action metal having an anode lead projecting therefrom;

forming a resist layer around said anode lead and on a portion of said porous compact disposed in the vicinity of said anode lead;

forming a conducting polymer compound layer on both said resist layer and said oxide film; and removing concurrently said resist layer and a part of said conducting polymer compound layer disposed on said resist layer.

2. The method as recited in claim 1, wherein said resist layer is composed of any one of materials selected from a group consisting of thermally fusible organic compound, organic compound having a photodissociation property, organic compound having a thermal decomposition property, acid-soluble organic compound, alkali-soluble organic compound, solvent-soluble organic compound and solvent-swollen organic compound.

3. The method as recited in claim 1, wherein said resist layer is composed of glass.

4. The method as recited in claim 3, wherein said resist layer is removed by applying mechanical impact thereto.

5. The method as recited in claim 1 further including the steps of:

forming a carbon layer on said conducting polymer compound layer; and attaching an electrode to said carbon layer.

6. The method as recited in claim 1, wherein said resist layer is composed of paraffin.

7. The method as recited in claim 6, wherein said resist layer is removed by blowing a high temperature air thereto.

8. The method as recited in claim 7, wherein said air has 120 degrees centigrade or more of temperature.

9. The method as recited in claim 7, wherein said air is accelerated by passing through a nozzle.

10. The method as recited in claim 1, wherein said resist layer is composed of butadiene resin.

11. The method as recited in claim 10, wherein said resist layer is removed by heating.

12. The method as recited in claim 11, said resist layer and said conducting polymer compound layer is heated at 300 degrees centigrade or more.

13. The method as recited in claim 10, wherein said resist layer is removed by heating and further blowing a pressurized air thereto.

14. The method as recited in claim 1, wherein said resist layer is composed of cresol novolak resin.

15. The method as recited in claim 14, wherein said resist layer is removed by soaking said two layers in sodium hydroxide solution.

16. The method as recited in claim 1, wherein said resist layer is composed of epoxy resin.

17. The method as recited in claim 16, wherein said resist layer is removed by ultrasonically cleaning said two layers in pure water.

* * * * *

UNITED STATES PATENT AND TRADEMARK OFFICE
CERTIFICATE OF CORRECTION

PATENT NO. : 5,454,147
DATED : October 3, 1995
INVENTOR(S) : Atsushi KOBAYASHI, Takashi FUKAUMI, Koji SAKATA, Satoshi ARAI
Toshihiko NISHIYAMA and Takashi KONO It is certified that error(s) appears in the above-identified patent and that said Letters Patent is hereby corrected as shown below:

Col. 4, line 59, delete "tool" and insert --mol--.

Col. 9, line 21, delete "on" and insert --over--.

Col. 9, lines 31-37, delete "any one of materials selected from a group consisting of thermally fusible organic compound, organic compound having a photodissociation property, organic compound having a thermal decomposition property, acid-soluble organic compound, alkali-soluble organic compound, solvent-soluble organic compound and solvent-swollen organic compound" and insert --an organic material--.

Col. 10, line 11, delete " a high temperature".

Col. 10, line 11, after "thereto" insert --at a temperature sufficient to substantially remove the resist layer--.

Col. 10, line 16, after "nozzle" insert --and the accelerated air is directed onto the resist layer--.

UNITED STATES PATENT AND TRADEMARK OFFICE
CERTIFICATE OF CORRECTION

PATENT NO. : 5,454,147
DATED : October 3, 1995
INVENTOR(S) : Atsushi KOBAYASHI, Takashi FUKAUMI, Koji SAKATA, Satoshi ARAI Toshihiko NISHIYAMA and Takashi KONO It is certified that error appears in the above-indentified patent and that said Letters Patent is hereby corrected as shown below:

Col. 10, line 30, delete "two layers" and insert --resist layer and said conducting polymer compound layer--.

Col. 10, line 36, delete "two layers" and insert --resist layer and said conducting polymer compound layer--.

Col. 10, line 22, delete "is" and insert --are--.

Signed and Sealed this

Thirtieth Day of July, 1996

Attest:

BRUCE LEHMAN

*Attesting Officer*   *Commissioner of Patents and Trademarks*